United States Patent [19]

Naarmann

[11] Patent Number: 4,547,270

[45] Date of Patent: Oct. 15, 1985

[54] ELECTROCHEMICAL POLYMERIZATION OF PYRROLES, AN ANODE FOR CARRYING THIS OUT, AND PRODUCTS OBTAINED BY THIS PROCEDURE

[75] Inventor: Herbert Naarmann, Wattenheim, Fed. Rep. of Germany

[73] Assignee: BASF Aktiengesellschaft, Fed. Rep. of Germany

[21] Appl. No.: 633,282

[22] Filed: Jul. 23, 1984

[30] Foreign Application Priority Data

Jul. 27, 1983 [DE] Fed. Rep. of Germany ....... 3327012

[51] Int. Cl.$^4$ ................................................. C25B 3/02
[52] U.S. Cl. ................................ 204/58.5; 204/59 R; 204/72; 204/78; 204/180.9; 204/180.2; 252/500; 526/62
[58] Field of Search ................ 204/181 F, 58.5, 59 R, 204/78, 181 R, 72

[56] References Cited

U.S. PATENT DOCUMENTS 3,574,072  4/1971  Louvar.
4,401,545  8/1983  Naarmann et al.
4,468,291  8/1984  Naarmann et al. ............... 204/78 X

FOREIGN PATENT DOCUMENTS 3321281  12/1983  Fed. Rep. of Germany.

OTHER PUBLICATIONS

"New Electrochemically Generated Organic Conducting Polymers", Tourillon et al, Spring MTG-Electrochemical Society Incorporated, May, 1982.
Chemical Engineers' Handbook, Perry et al, 1973, pp. 4-68 and 4-69.
Electrochemical Polymerization of Pyrrole, Diaz et al, J.C.S. Chem. Comm., 1979, p. 635.

Primary Examiner—Joseph L. Schofer
Assistant Examiner—S. Babajko
Attorney, Agent, or Firm—Keil & Weinkauf

[57] ABSTRACT

Pyrroles or mixtures of pyrroles with comonomers are polymerized electrochemically by anodic oxidation of the monomers in solution or dispersion in an electrolyte solvent, in the presence of a conductive salt, with deposition of the pyrrole polymer at the sheet-like anode, by a process in which the anode used consists of an electrically non-conductive sheet-like element which can be impregnated with the electrolyte solution and one or more electrically conducting support and contact strips which connects electrically to a current supply for the anode.

The special anode for the electrochemical polymerization of pyrroles, and the products obtainable by the process.

6 Claims, No Drawings

ELECTROCHEMICAL POLYMERIZATION OF PYRROLES, AN ANODE FOR CARRYING THIS OUT, AND PRODUCTS OBTAINED BY THIS PROCEDURE

The present invention relates to a process for the electrochemical polymerization of pyrroles or mixtures of pyrroles with comonomers by anodic oxidation of the monomers or monomer mixtures in an electrolyte solvent in the presence of a conductive salt, with deposition of the pyrrole polymers on the anode. The present invention furthermore relates to a sheet-like anode for carrying out this process, and to the pyrrole polymers obtained by this process.

The electrochemical polymerization of pyrrole or a mixture of a pyrrole with comonomers has been disclosed (cf., inter alia, J. Chem. Soc. Chem. Comm. 1979, pages 635 and 854, U.S. Pat. No. 3,574,072 and DE-A-30 49 551). In this procedure, pyrrole or the pyrrole/comonomer mixture is electrolyzed in an electrolyte solvent, as a rule an organic one, in the presence of a conductive salt, the pyrrole polymers being formed as a result of anodic oxidation and being deposited on the anode. The conductive salts, for example alkali metal, ammonium or phosphonium salts containing anions from the group consisting of $BF_4^-$, $AsF_6^-$, $SbF_6^-$, $PF_6^-$, $SbCl_6^-$, $ClO_4^-$, $HSO_4^-$, and $SO_4^{2-}$, are partially or completely incorporated in the pyrrole polymers, probably being bonded in the form of a complex, and impart high electrical conductivity of up to about $10^2$ $Ohm^{-1}cm^{-1}$ to the pyrrole polymers prepared in this manner.

The use of sheet-like anodes gives pyrrole polymer films which, when sufficiently thick, e.g. thicker than 20 μm, can be removed from the anode in the form of self-supporting films. The anode material used in this procedure is, in particular, a stainless steel, nickel, titanium or a noble metal, preferably platinum or palladium. The use of other electrically conductive substances, for example electrically conductive plastic sheets or films, as anode material in the electrochemical polymerization of pyrroles has also been proposed. In some cases, this procedure gives composite materials, in which the electrically conductive polypyrroles anodically produced and deposited adhere firmly to the electrically conductive substrate used as anode material. Composite materials of this type therefore consist of two or more electrically conductive layers possessing differentiated properties.

Because of their high electrical conductivity, good thermal stability and stability to oxygen, and their other general chemical and physical properties, polypyrroles have recently attracted a great deal of attention for a number of applications, for example in electrical switches, semi-conductor components and electrochemical storage elements, as electrodes and shielding materials, or for the antistatic treatment of plastics. For the various fields of use, there is a need for versatile, improved and/or modified pyrrole polymers.

Varying the mechanical properties of pyrrole polymers by selecting the conductive salts used in their preparation has been proposed. Furthermore, the modification of pyrrole polymers by incorporating various comonomers, and the pressing of pyrrole polymers at elevated temperatures and under superatmospheric pressure onto electrically non-conductive bases, e.g. plastic sheets or films, to form multi-layer elements, have been proposed.

It is an object of the present invention to provide other modified highly electrically conductive pyrrole polymers possessing good physical, in particular mechanical, properties, and in particular a process for their preparation and means for carrying out this process which permit a wide variety of modified, highly electrically conductive pyrrole polymers of the stated type to be prepared simply and readily.

We have found that this object is achieved, in accordance with the invention, if, in the electrochemical polymerization of pyrroles or pyrrole/comonomer mixtures, the anode used is a sheet-like element which consists of an electrically non-conductive material, can be impregnated with the electrolyte and is connected to the current supply for the anode via one or more electrically conducting support and contact strips.

The present invention accordingly relates to a process for the electrochemical polymerization of a pyrrole or a mixture of pyrroles with comonomers by anodic oxidation of the monomers in solution of dispersion in an electrolyte solvent, in the presence of a conductive salt, with deposition of the pyrrole polymer on the sheet-like anode, wherein the anode consists of an electrically non-conductive sheet-like element which can be impregnated with the electrolyte solution and is permeable to it, and which is connected electrically to the current supply for the anode via one or more electrically conducting support and contact strips.

The present invention furthermore relates to a sheet-like anode for use in the electrochemical polymerization of pyrroles or mixtures of pyrroles with comonomers, which consists of an electrically non-conductive sheet-like element which can be impregnated with the electrolyte and is permeable to it, and which possesses one or more electrically conducting support and contact strips which connect the non-conductive sheet-like element to the current supply for the anode.

The present invention furthermore relates to pyrrole polymers intimately bonded with a porous, electrically non-conductive, sheet-like base, some or all of the polymer being incorporated in the base and/or penetrating the latter, as can be obtained by the novel process and with the aid of the anode according to the invention.

We have found, surprisingly, that, in the electrochemical polymerization of pyrroles or pyrrole/comonomer mixtures for the preparation of sheet-like pyrrole polymers, the sheet-like anode need not consist of an electrically conductive material, it being sufficient if an electrically non-conductive porous base is provided with one or more electrically conducting support and contact strips which are connected to the current supply for the anode. In spite of this, polymer formation takes place over the entire area of the anode, some or all of the polymer being incorporated in the base material of the anode and penetrating this material. In this procedure, polymer deposition on or in the anode material begins at the electrically conducting support and contact strip and, depending on the duration of electrolysis, extends over the entire anode area, until finally a uniform and closed pyrrole polymer surface has formed. If electrolysis is continued, the thickness of the polypyrrole layer produced on the anode material can then be increased.

According to the invention, suitable anodes are sheet-like elements consisting of electrically non-conductive materials, e.g. cellulose, cellulose derivatives, natural and/or synthetic fibers and/or filaments, plastics, inorganic materials, such as glass or clay, etc. The anode material should not have a closed surface or structure, but should be capable of being penetrated by this electrolyte used in the electrochemical polymerization, i.e. it should be capable of being impregnated with the electrolyte. Suitable sheet-like anode elements are therefore porous materials, for example woven fabrics, knitted fabrics, laid webs, plaits, nets, nonwovens, felts, open-cell foams and other pore-containing bases having a porous or open structure and consisting of the electrically non-conductive materials. These include woven fabrics, knitted fabrics, laid webs, plaits or nets of natural and/or synthetic fibers and/or filaments, nonwoven fibrous materials, fiber mats, bonded fabrics, such as webs or felts, unsized papers and cardboards, filter papers, tissue papers, etc. The fibers and/or filaments can consist of cellulose, cellulose derivatives, jute, hemp, cotton, silk, nylons, polyesters, polyethylene, polypropylene, polyvinyl chloride or polyacrylonitrile, or of inorganic substances, e.g. glass. Other examples of suitable anode materials are shaped articles consisting of open-cell foams or other porous materials, e.g. clay etc.. Examples of these are films and sheets consisting of open-cell foamed plastics, e.g. polystyrene, polyethylene, polyvinyl chloride, polyurethanes or melamine-formaldehyde resins. In the woven fabrics, knitted fabrics, laid webs, plaits, nets, nonwovens or felts used according to the invention as anode material, the filament-free area, i.e. that part of the total area of these structures which is not covered by filaments or fibers, and the size of the openings in this structure, and, in the case of the other porous bases and the open-cell foams, the pore volume, are generally kept relatively small if the resulting pyrrole polymers which are incorporated in these bases and which penetrate them are desired to have a very uniform structure.

Although the sheet-like elements used according to the invention as the anode can in principle be of any shape, quadrilateral sheet-like elements possessing one or more pairs of parallel sides, in particular rectangular or square sheet-like elements, are preferably used. One or more, preferably two, support and contact strips are firmly, but preferably detachably, bonded to these electrically non-conductive sheet-like elements. The support and contact strips can be connected to the said elements by means of, for example, conventional gripping or clamping elements. The said strips consist of an electrically conductive material, in particular a metal, and stainless steels, titanium, nickel and noble metals, such as palladium and in particular platinum, have proven particularly useful for this purpose.

The length of the support and contact strips can be varied within wide limits. However, since this factor also plays a part in determining the nature and shape of the pyrrole polymer deposit, the length of the support and contact strips should not be chosen too low in relation to the extent of the electrically non-conductive sheet-like elements. If the preferred quadrilateral sheet-like elements are used as the anode, it has proven advantageous for the support and contact strips to be the same length as the sides of the electrically non-conductive sheet-like element on which they are mounted. Preferred anodes are those which consist of quadrilateral, in particular rectangular or square, electrically non-conductive sheet-like elements on opposite sides of which two support and contact strips are attached. If two of the said strips are attached to the stated element, it has proven advantageous if the distance between these strips is from 0.1 to about 10 cm.

The said strips also have a terminal by means of which they can be connected to the current supply for the anode. This terminal can be a conventional clamp, plug and socket or screw connector.

The novel anode possessing the electrically non-conductive sheet-like element and the support and contact strip or strips is very useful for the electrochemical polymerization of pyrroles or mixtures of pyrroles with comonomers.

For the purposes of the present invention, pyrroles are pyrrole itself and substituted pyrroles, such as N-alkylpyrroles, N-arylpyrroles or pyrroles which are monosubstituted or disubstituted at the carbon atoms by alkyl or by halogen. A preferred member from the class comprising the pyrroles is unsubstituted pyrrole itself. Among the substituted pyrroles, pyrroles which are monosubstituted or disubstituted at the carbon atoms by alkyl or by halogen are preferred, e.g. 3,4-dichloropyrrole and the 3,4-dialkylpyrroles where alkyl is of 1 to 4 carbon atoms, such as 3,4-dimethylpyrrole and 3,4-diethylpyrrole.

Examples of comonomers which can be used in a mixture with the pyrroles in the novel process are other five-membered or six-membered heterocyclic compounds, e.g. imidazole, thiazole, and preferably furan and thiophene. Other examples of compounds which copolymerize with the pyrroles are cyclopentadiene, azulene and its derivatives, such as benzazulene or kajaazulene, and fulvene, indene and quadratic acid. 2-Bromothiophene, 2,6-dimethylpyridine and pyrazine can also be used as comonomers. Particular examples of aromatic comonomers are the linear fused polynuclear aromatics, such as anthracene, tetracene, pentacene, etc. The mixtures of pyrroles and comonomers can contain from 0.1 to 10 parts of the comonomers per 10 parts of the pyrroles.

Monomers which are preferably used in the novel process are unsubstituted pyrrole itself or mixtures of unsubstituted pyrrole with other pyrroles and/or with the other comonomers stated, the amount of unsubstituted pyrrole in the said mixtures preferably being from 75 to 99% by weight, based on the monomer mixture.

For the purposes of the present invention, pyrrole polymers are accordingly homopolymers and copolymers of pyrroles, in particular homopolymers and copolymers of unsubstituted pyrrole itself.

The electrochemical polymerization of the pyrroles or of the mixtures of the pyrroles with the comonomers is carried out in an electrolyte solvent in which the monomers are dissolved or dispersed. Suitable electrolyte solvents are the polar organic solvents conventionally used for the said polymerization, e.g. alcohols, ethers, such as dioxane or tetrahydrofuran, acetone, acetonitrile, dimethylformamide, N-methylpyrrolidone, dimethyl sulfoxide or sulfolane. If a water-miscible organic solvent is used, it is also possible to add a small amount of water, e.g. not more than 10% by weight based on the electrolyte solvent, in order to increase the electrical conductivity. If dispersants, in particular non-ionic emulsifiers or anionic soaps, are concomitantly used, or if aromatic sulfonic acids or their salts are used as conductive salts, it is also possible to carry out the electrochemical polymerization in an electrolyte solvent consisting predominantly of water, in particular using water itself as an electrolyte solvent, as described in, for example, the prior patent publications Nos. DE-A-33 18 856 and DE-A-33 18 857.

In the electrochemical polymerization of the pyrroles or of the mixtures of pyrroles with comonomers, the monomer concentration is kept in general at from 0.001 to 5 moles, preferably from 0.01 to 1 mole, per liter of electrolyte solvent, but may be above or below these limits.

When the novel process is carried out, the electrolyte solvent also contains a conductive salt which serves, in particular, to transport current in the electrolyte solvent during the electrochemical polymerization, but which is also partially or completely incorporated into the resulting pyrrole polymer and plays a role in influencing the properties of this polymer. Suitable conductive salts are all ionic or ionizable compounds which are conventionally used for this purpose and are soluble in the electrolyte solvent and for which the deposition potential of the anion is above about 0.8–1 volt, measured with reference to a standard calomel electrode. In the novel process, the concentration of the conductive salt is in general from 0.001 to 1, preferably from 0.01 to 0.5, mole per liter of electrolyte solvent. The conductive salts contain, as cations, $H^+$ or, in particular, the alkali metal cations, preferably $Li^+$, $Na^+$ or $K^+$, or tertiary or quaternary onium cations, especially those of nitrogen or of phosphorus. The tertiary or quaternary ammonium or phosphonium cations can contain lower alkyl radicals, cycloaliphatic radicals or aromatic radicals, and, like the alkali metal cations, are preferred. Anions which have proven particularly advantageous for the conductive salt are the tetrafluoborate, tetrafluoroarsenate, hexafluoroarsenate, hexafluoroantimonate, hexachloroantimonate, hexafluorophosphate, perchlorate, bisulfate and sulfate anions. Other particularly advantageous conductive salts are those which contain anions of aromatic sulfonic acids, e.g. the benzenesulfonate or toluenesulfonate anion, or anionic polymeric aromatic sulfonic acid compounds, e.g. the polystyrylsulfonate anion. Other conductive salts possessing anions of aromatic sulfonic acids are described in, for example, No. DE-A-33 18 857. Salts of aliphatic or aromatic carboxylic acids, e.g. acetic acid, propionic acid or benzoic acid, can also be used as conductive salts in the novel process. In the process according to the invention, the conductive salts are used in general in an amount of from 10 to 40 mole %, based on 1 mole of the monomer to be polymerized. The conductive salts can be used alone or as a mixture with one another.

The novel process can be carried out in a conventional electrolysis cell or electrolysis apparatus. Examples of very suitable apparatuses are simple electrolysis apparatuses consisting of a cell without a diaphragm, and with two electrodes and an external current source. The anodes used are the electrically non-conductive sheet-like elements which have been described above and possess one or more electrically conducting support and contact strips. The cathode can be made of a conventional inert electrode material, e.g. graphite, and consists in particular of stainless steel, nickel, titanium or a noble metal, such as platinum or palladium. Preferably, the cathode, too, is sheet-like, and the surfaces of the cathode and anode are arranged parallel to one another.

Apart from the stated simple electrolysis cells without a diaphragm, the novel process can also be carried out using other electrolysis apparatuses, for example cells with diaphragms or those containing reference electrodes for exact determination of the potential. It is frequently advantageous to measure the amount of current (A sec).

The process according to the invention is usually carried out at room temperature. However, the reaction temperature in the novel process has proven not to be critical, so that it can be varied within a wide range provided that it does not fall below the solidification temperature of the electrolyte solvent or exceed the boiling point of the latter. In general, a polymerization temperature of from 0° to 50° C., in particular from +10° to +30° C., has proven very advantageous.

Any direct current source, e.g. a battery, which delivers a sufficiently high electrical voltage can be used as a current source for operating the electrolysis cell in which the novel process is carried out. Usually, the electrochemical polymerization according to the invention is carried out using a voltage of from 0.1 to 100, preferably from 1.5 to 25, volt. A current density of from 0.05 to 20, preferably from 1 to 10, $mA/cm^2$ has proven advantageous.

Factors on which the duration of electrolysis depends include the electrolyte system used and the particular electrolysis conditions, but the type of end product desired also plays a particularly decisive role in determining the duration, which can therefore vary within wide limits. As stated above, in the novel process the formation of the pyrrole polymer on the sheet-like anode element begins at the support and contact strips and extends over the entire anode surface in the course of the electrolysis. Furthermore, polymer formation first takes place, either predominantly or completely, in the electrically non-conductive sheet-like element of the anode, and it is only subsequently that the thickness of the polymer film increases, i.e. the pyrrole polymers are deposited on the sheet-like anode material.

Depending on its duration, the process according to the invention can therefore give various end products. For example, if a sheet-like anode material possessing two support and contact strips mounted at two opposite sides of the sheet-like element is used, deposition of the pyrrole polymers takes place uniformly from these edges to the middle of the said element. If the electrolysis is terminated after a short period at a point in time when the polymer deposits on or in the anode have not yet merged, the result is a sheet-like product comprising two electrically conductive side strips and an electrically insulating central strip. In the side regions, the sheet-like anode material has been penetrated by the pyrrole polymers and can be regarded as a sort of base for this. Although the pyrrole polymers have not yet formed a closed and continuous surface, and the surface of the base is still partially visible, these side strips already possess the high electrical conductivity of the conventional polypyrrole films, i.e. from 1 to $10^2$ $Ohm^{-1}cm^{-1}$.

If the electrolysis is continued for a longer period, the pyrrole polymers grow from the two support and contact strips and finally meet in the middle, the entire area of the electrically non-conductive sheet-like element used as the anode being penetrated uniformly by the said polymers. If the electrolysis is terminated at this point in time, the result is a product in which the pyrrole polymers are incorporated in the porous sheet-like element which is used as the anode and has a woven, net, web, pore, cellular or other open structure. The process can also be controlled in such a way that a closed uniform pyrrole polymer surface is not formed.

In such a product, the mechanical, and to a large extent also the chemical, properties are substantially determined by the base material of the electrically non-conductive sheet-like element, which in this case, however, has a high electrical conductivity. Hence, this version of the process can be used to vary the electrical properties of the electrically non-conductive sheet-like elements used as anode material.

Finally, if the electrolysis is continued still further, a continuous, closed film of the pyrrole polymers is formed on the sheet-like element used as the anode, the thickness of this film depending on the duration of electrolysis. In this case, the electrically non-conductive sheet-like element used as the anode is incorporated, as a supporting and base material, in the resulting pyrrole polymer film. The incorporated supporting and base material imparts, for example, high mechanical strength or flexibility to the pyrrole polymer films.

When the electrolysis is complete, the products obtained by the novel process are washed with a solvent, preferably water or an aqueous solvent, to remove adhering conductive salt, and are dried at from 25° to 150° C., preferably under reduced pressure.

The novel process is very versatile and permits the preparation of a very large variety of pyrrole polymer products having high electrical conductivity, in general greater than $10^{-2}$, in particular greater than 1, $Ohm^{-1}cm^{-1}$, in a simple and reproducible manner. Electrical conductivity is measured by the two-point or four-point method. The products obtained by the process according to the invention have very good performance characteristics and, compared to many of the conventional pyrrole polymer films, possess improved or modified properties which make them suitable for a wide range of uses. The products according to the invention are preferably used in the production of electrical switches, semiconductor components, electrodes, electrochemical storage elements and shielding materials.

The Examples which follow illustrate the invention. Parts and percentages are by weight, unless stated otherwise.

EXAMPLE 1

The process was carried out in a flow-through electrolysis cell of 100 ml capacity. The cathode used was a rectangular platinum sheet having a surface area of 10 $cm^2$. The anode used was a rectangular filter paper which had the same surface area and at two opposite sides of which a platinum support and contact strip was attached by means of a clamp. The support and contact strips were connected to the supply from the external current source (battery). The electrodes were arranged parallel to one another and 6 cm apart. A solution of 7.54 g of pyrrole and 12.94 g of tri-n-butylammonium benzenesulfonate in 1600 ml of acetonitrile was used as the electrolyte, which was pumped through the electrolysis cell at a rate of about 30 liters/hour. The electrolysis was carried out at room temperature, using a voltage of 20 volt and a current density of 5.76 $mA/cm^2$, and was terminated after 30 minutes. The filter paper was completely covered with polypyrrole and had a conductivity of 45 $Ohm^{-1}cm^{-1}$. No change in the conductivity was observed after storage for four hours.

EXAMPLES 2 TO 8

The procedure described in Example 1 was followed, except that in these cases the anodes used were appropriate sheet-like elements consisting of (2) a glass fabric, a fabric of (3) cellulose fibers, (4) hemp, (5) silk and (6) polyacrylonitrile, (7) a mat of polyethylene short fibers and (8) an open-cell polystyrene foam. In every case, a product similar to that described in Example 1 was obtained.

We claim:

1. A process for the electrochemical polymerization of a pyrrole or a mixture of a pyrrole with a comonomer by anodic oxidation of the monomers in solution or dispersion in an electrolyte solvent, in the presence of a conductive salt, with deposition of the pyrrole polymer on a sheet-like element of the anode, said anode consisting essentially of a porous, electrically non-conductive, sheet-like element which can be impregnated with said electrolyte solution or dispersion and one or more electrically conducting support and contact strips integral with and in functional relationship with said sheet-like element by electrically connecting said sheet-like element with the anode current supply.

2. A process in accordance with claim 1, wherein the anode contains a quadrilateral sheet-like element possessing one or two pairs of parallel sides.

3. A process as claimed in claim 1, wherein two support and contact strips are mounted opposite one another on the electrically non-conductive sheet-like element.

4. A process as claimed in claim 1, wherein the electrically non-conductive sheet-like element is a woven fabric, a knitted fabric, a laid web, a plait, a net, a nonwoven fibrous material, a web, a fiber mat, a felt or an open-cell foam.

5. A process as claimed in claim 1, wherein the electrically non-conductive sheet-like element consists of cellulose, a cellulose derivative, natural and/or synthetic fibers and/or filaments, a plastic or an inorganic material.

6. A process as claimed in claim 1, wherein the electrochemical polymerization is carried out using a voltage of from 1 to 100 volt and a current density of from 0.05 to 20 $mA/cm^2$.

* * * * *